United States Patent [19]
Chang et al.

[11] Patent Number: 5,392,154
[45] Date of Patent: Feb. 21, 1995

[54] SELF-REGULATING MULTIWAVELENGTH OPTICAL AMPLIFIER MODULE FOR SCALABLE LIGHTWAVE COMMUNICATIONS SYSTEMS

[75] Inventors: Gee-Kung Chang, Holmdel; Lars E. Eskildsen, Atlantic Highlands; Evan L. Goldstein, Princeton; Muhammed Z. Iqbal, Tinton Falls; Chinlon Lin, Holmdel, all of N.J.

[73] Assignee: Bell Communications Research, Inc., Livingston, N.J.

[21] Appl. No.: 220,088

[22] Filed: Mar. 30, 1994

[51] Int. Cl.$^6$ ............................................... H01S 3/16
[52] U.S. Cl. .................................... 359/341; 359/349; 359/124
[58] Field of Search ............... 354/124, 127, 134, 160, 354/341, 349

[56] References Cited

U.S. PATENT DOCUMENTS

| | | | |
|---|---|---|---|
| 4,886,334 | 12/1989 | Aoki | 359/341 |
| 4,945,531 | 7/1990 | Suzuki | 370/3 |
| 5,111,334 | 5/1992 | Heidemann | 359/341 |
| 5,225,922 | 7/1993 | Chraplyvy et al. | 359/124 |
| 5,239,607 | 8/1993 | da Silva et al. | 385/122 |
| 5,331,449 | 7/1994 | Huber et al. | 359/341 X |

OTHER PUBLICATIONS

C. R. Giles, E. Desurvire, "Modeling Erbium-Doped Fiber Amplifiers", *Journal of Lightwave Technology*, vol. 9, No. 2, pp. 271–283, Feb. 1991.

A. Chraplyvy, J. Nagel, and R. Tkach, "Equalization in Amplified WDM Lightwave Transmission Systems", *IEEE Photon, Technol. Lett.*, vol. 4, No. 8, pp. 920–922, Aug. 1992.

K. Inoue, T. Kominato, H. Toba "Tunable Gain Equalization Using A Mach–Zehnder Optical Filter in Multistage Fiber Amplifiers", *IEEE Photon. Technol. Lett.*, vol. 3, No. 8, pp. 718–720, Aug. 1991.

S. Su, R. Olshansky, G. Joyce, D. Smith, J. Baran, "Gain Equalization in Multiwavelength Lightwave Systems Using Acoustooptic Tunable Filters", *IEEE Photon. Technol. Lett.*, vol. 4, No. 3, pp. 269–272, Mar. 1992.

C. R. Giles and E. Desurvire, "Propagation of Signal and Noise in Concatenated Erbium–Doped Fiber Optical Amplifiers," *IEEE Journal of Lightwave Technology*, vol. 9, pp. 147–154, 1992.

*Primary Examiner*—Mark Hellner
*Attorney, Agent, or Firm*—Leonard Charles Suchyta; Stephen M. Gurey

[57] ABSTRACT

In a multiwavelength lightwave communications system automatic self-power regulation on a channel-by-channel basis is achieved with a cascade of multiwavelength amplifier modules (200), wherein each multiwavelength amplifier module in the cascade includes a plurality of pump-shared parallel fiber amplifiers (208) operated in gain-saturation and connected between an optical demultiplexer (203) and multiplexer (209). An optional first gain stage (202) improves performance with higher optical signal-to-noise ratio. By self-regulating the power in each channel, the communications system is scalable, allowing the system to grow without deleterious effects due to power spread.

12 Claims, 6 Drawing Sheets

SELF-REGULATING MULTIWAVELENGTH OPTICAL AMPLIFIER MODULE FOR SCALABLE LIGHTWAVE COMMUNICATIONS SYSTEMS

GOVERNMENT RIGHTS

This invention was made with Government support under Agreement No. MDA972-92-H-0010 awarded by DARPA. The Government has certain rights in the invention.

BACKGROUND OF THE INVENTION

This invention relates to lightwave communications systems, and more particularly to multiwavelength lightwave communications systems.

In single wavelength long distance optical communications systems, fiber amplifiers, such as erbium-doped fiber amplifiers, are periodically spaced along the fiber path to compensate for the transmission losses that accumulate as the light traverses the transmission fibers and other optical components along the system. The gain of each amplifier in the cascade can match the signal loss in the portion of the transmission path that follows the previous amplifier in the cascade. It is known (see, e.g., C. R. Giles and E. Desurvire, "Modeling Erbium-Doped Fiber Amplifiers", *IEEE Journal of Lightwave Technology*, Vol. 9, No. 2, pp. 271–283, February 1991) that a cascade of saturated fiber amplifiers acts to self-regulate the signal power through the transmission system. Accordingly, the power output of the first amplifier in a cascade of saturated fiber amplifiers is duplicated at the output of all the subsequent amplifiers along the system.

There is currently considerable interest in building large, multiwavelength communications systems to support the envisioned high-capacity information networks of the future. Such multiwavelength systems will advantageously have increased signal carrying capacity. Furthermore, and even more significantly, the multiple wavelengths will be used for the purposes of signal routing. As in the single-wavelength optical communications systems, in multiwavelength systems cascades of optical amplifiers will be required to compensate for the losses that accumulate as the light traverses the transmission fibers, and the larger losses that the signals encounter from the optical switches and routers along the optical signal path.

The most significant technical obstacle standing in the way of such large, amplified multiwavelength communications systems is the nonuniform gain spectrum of fiber amplifiers. Although erbium-doped fiber amplifier gain spectra are typically flat within three decibels over a bandwidth of approximately 20 nm, these relatively modest gain nonuniformities in a single erbium-doped fiber amplifier will accumulate along a cascade, resulting in exponentially rising interchannel power variations.

Mathematically, each erbium-doped fiber amplifier provides gain, in dB, given by $$G_{dB}(\lambda) \sim \int_0^l [\sigma_e(\lambda) n_2(z) - \sigma_a(\lambda) n_1(z)] dz, \quad (1)$$

where $\sigma_e(\lambda)$ and $\sigma_a(\lambda)$ are the emission and absorption cross-sections, $n_1$ and $n_2$ are the lower- and upper-state population densities, and $l$ is the amplifier's length. The integrand of equation (1) exhibits a wavelength-dependence imposed by $\sigma_e(\lambda)$ and $\sigma_a(\lambda)$, which are in turn determined by the spectroscopic properties of erbium atoms in silicate glass. While this wavelength-dependence can be modified, via $n_1$ and $n_2$, by adjusting pumping and saturation levels, it cannot be eliminated. Equation (1) thus implies that wavelength-multiplexed channels traversing a chain of nominally identical amplifiers will develop an interchannel power spread that grows exponentially along the chain. Thus, as a multiwavelength network is scaled up in size, channels residing off the gain peak will fall towards power levels that are undetectable in the presence of receiver noise or amplifier-induced beat noise or both. Such behavior is in effect fundamental and inherent in the spectroscopy of erbium ions in silica glass, which is the only material system, so far, that has succeeded in providing practical optical gain for lightwave communications systems. Thus, power regulation that is noted above as being achievable with a cascade of saturated fiber amplifiers in a single wavelength optical system will not be effective in a multiwavelength optical system. Rather, in a multiwavelength system, the output of each conventional fiber amplifier will be regulated on a total power basis, and not on a channel-by-channel basis.

Various prior art approaches to this problem have been proposed. In a first approach (A. R. Chraplyvy, J. A. Nagel, and R. W. Tkach, "Equalization in Amplified WDM Lightwave Transmission Systems", *IEEE Photon. Technol. Lett.*, Vol. 4, No. 8, pp. 920–922, August 1992) the transmitter power is selectively boosted for wavelengths that propagate weakly through the system. Such an approach may be effective in modest-size point-to-point links, but is not promising in networks, especially those with dynamically reconfiguring signal paths. A second approach (K. Inoue, T. Kominato, and H. Toba, "Tunable Gain Equalization Using a Mach-Zehnder Optical Filter in Multistage Fiber Amplifiers", *IEEE Photon. Technol. Lett.*, Vol. 3, No. 8, pp. 718–720, August 1991) uses fixed filters to selectively suppress wavelengths that propagate too strongly. This approach has also achieved some success, but it is not adjustable in the event of component or amplifier-inversion-level variations. Moreover, it cannot be scaled to very large system sizes due to critical matching difficulties. In a third approach (S. F. Su et al, "Gain Equalization in Multiwavelength Lightwave Systems Using Acoustooptic Tunable Filters", *IEEE Photon. Technol. Lett.*, Vol. 4, No. 3, pp. 269–271, March 1992) channel-suppression filters are embedded in servo-loops, one servo-loop being used per channel per amplifier. Although it is in principle effective, this approach is complex. Furthermore, this third approach imposes increased system losses that must themselves be compensated for by additional gain stages.

In co-pending patent application Ser. No. 056,098, filed May 5, 1993 pending, two of the co-inventors thereof also being co-inventors of the present invention, a scalable multiwavelength optical amplifier cascade is disclosed which presents a solution to this problem. As described therein, channel-by-channel self-regulation is achieved in an optical communications system by using a cascade of inhomogeneously broadened erbium-doped fiber amplifiers operated in gain-saturation as opposed to the conventional homogeneously broadened fiber amplifiers used in a single wavelength systems. Unlike in a conventional homogeneously broadened erbium-doped fiber amplifier in which all channels are coupled to a single collection of gain-giving erbium ions, in an inhomogeneously broadened erbium-doped fiber amplifier, each channel interacts with its own private set of erbium ions. It was thus recognized therein that a saturated cascade of inhomogeneously broadened fiber amplifiers will exhibit saturation-induced self-regulation of signal power on a channel-by-channel basis. Inhomogeneous broadening of the erbium-doped fiber amplifiers was achieved by cooling them to a temperature substantially below 0° C., such as by placing them in a liquid nitrogen bath. The practicality of such an arrangement in an actual communications system, however, is at present undemonstrated. Although alternative methods of achieving inhomogeneous broadening of fiber amplifiers are feasible, further developments in applied physics are needed before other practical realizations are possible.

An object of the present invention is to provide in a multiwavelength lightwave communications system power self-regulation on a channel-by-channel basis with a minimum of optical component complexity and which can be implemented with maximum practicality.

SUMMARY OF THE INVENTION

In the multiwavelength lightwave communications system of the present invention automatic self-power regulation on a channel-by-channel basis is achieved with a cascade of multiwavelength amplifier modules, wherein each multiwavelength amplifier module in the cascade includes a plurality of pump-shared parallel fiber amplifiers operated in gain-saturation and connected between an optical demultiplexer and multiplexer. Each of the fiber amplifiers individually amplifies one channel at a single wavelength. By keeping the amplification process of each wavelength channel physically distinct, immunity to interchannel cross-saturation problems is provided. Furthermore, channel-by-channel power regulation occurs and prevents differences in per channel amplifications from accumulating along the system. The system is thus scalable, allowing the system to be extended with additional amplifier stages without deleterious effects. In addition, each channel is self-adjusting to changes that occur over long periods of time. An optional first gain stage, comprising a single and preferably strongly pumped conventional erbium-doped fiber amplifier, further improves performance with a higher optical signal-to-noise ratio. Furthermore, the inclusion of the optional first gain stage enables the self-regulating properties of the multiamplifier second stage to be realized with larger loss between multiwavelength amplifier modules, the latter implying that a greater distance or other loss inducing elements can be present between multiwavelength amplifier modules.

DETAILED DESCRIPTION

Figure 1:
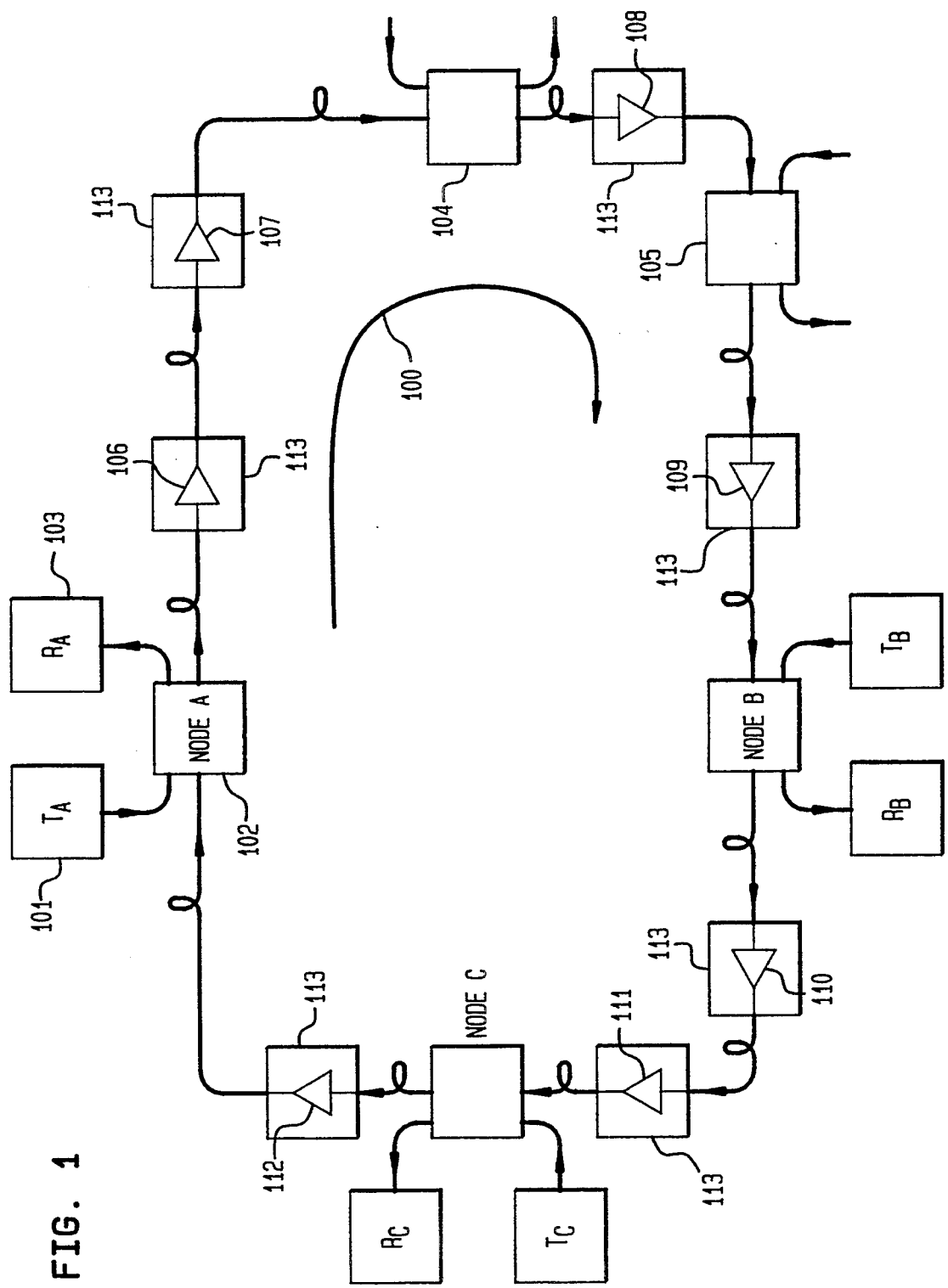
FIG. 1 is a block diagram of a multiwavelength optical communications system in accordance with the present invention.

With reference to FIG. 1, an example of a multiwavelength optical communications system is shown. This is an example of a typical ring network. Multiple wavelength optical communications networks can also be configured in a bus or tree format, or in any combination thereof. The network shown in FIG. 1 consists of three nodes, node A, node B, and node C. At node A, a transmitter ($T_A$) 101 couples signals to be transmitted at one or multiple wavelengths through a wavelength-selective switch 102 onto the ring 100. Simultaneously switch 102 couples signals directed to that node at one or plural wavelengths from the ring to the receiver ($R_A$) 103. In a similar manner the transmitters, $T_B$ and $T_C$, and receivers $R_B$ and $R_C$, at nodes B and C couple signals onto and off of the ring 100.

The communications system in FIG. 1 also includes wavelength-selective switches 104 and 105. Each of these switches serves to couple signal channels at one or more specific wavelengths off ring 100 and onto another ring, bus or tree network (not shown) and from that other ring, bus or tree network onto ring 100. Accordingly, through the use of such wavelength-selective devices, routing of signals at selected wavelengths to specific destinations can be achieved.

The communications system in FIG. 1 includes seven optical amplifier modules 106–112 to compensate for the losses encountered by the multiple wavelength channel signals both from the normal attenuation losses from transmission over lengths of optical fiber and from the losses introduced by the various and generally wavelength-selective devices through which the signals pass as they traverse the ring. Erbium-doped fiber amplifiers provide high gain over a wide bandwidth and are therefore particularly useful in optical communications systems to compensate for attenuation losses. As noted hereinabove, however, in conventional amplifier cascades, spectral gain nonuniformities across the amplifier bandwidth will cause different wavelength channels to be amplified by different gain factors. Small gain differences, which can be tolerated through a single amplifier stage, accumulate as the channels are amplified through the cascade of amplifiers, and result in significant differences in the power levels of the multiple channels at the output of the last amplifier stage. As a result, the power level of some channels may be reduced to levels that make them virtually undetectable. Although the system of FIG. 1 shows, for example, the channels transmitted from the transmitter $T_A$ of node A to the receiver $R_C$ of node C, traversing a cascade of six amplifier module stages, 106–111, in a larger, useful, system there are likely to be more amplifier stages. Thus, as previously noted, a small difference in power levels between two channels through one amplifier stage will result in very large accumulated power differences.

As previously described, channel-to-channel power variations in a cascade of conventional fiber amplifiers in a multiwavelength system accumulate because they are homogeneously broadened. This means that when a channel saturates the gain of a conventional fiber amplifier, it depresses not only its own gain, but also that at all other wavelengths in the system. As noted, this occurs because all channels are coupled to a single collection of gain-giving erbium ions. As discussed in the aforenoted co-pending patent application, by inhomogeneously broadening the fiber amplifier each channel will interact with its own private set of gain-giving erbium ions. By operating inhomogeneously broadened fiber amplifiers in the cascade in gain-saturation, such a system will exhibit saturation-induced self-regulation of signal power on a channel-by-channel basis. The present invention achieves this same advantageous channel-by-channel self-regulation of signal power by supplying a private set of gain-giving erbium ions to each channel by forcing each channel through a separate fiber amplifier. Amplification is thus separately supplied to each channel and the amplifier is totally immune to cross-saturation effects that cause the saturation of one channel to affect the gain of another channel. Furthermore, by operating the amplifiers in the cascade in gain-saturation, each channel automatically and individually provides self-regulation of signal power. The same advantages of an inhomogeneously broadened cascade are thus readily and simply achieved without requiring cooling of the fiber amplifiers in the cascade to a super-cool temperature.

Figure 2:
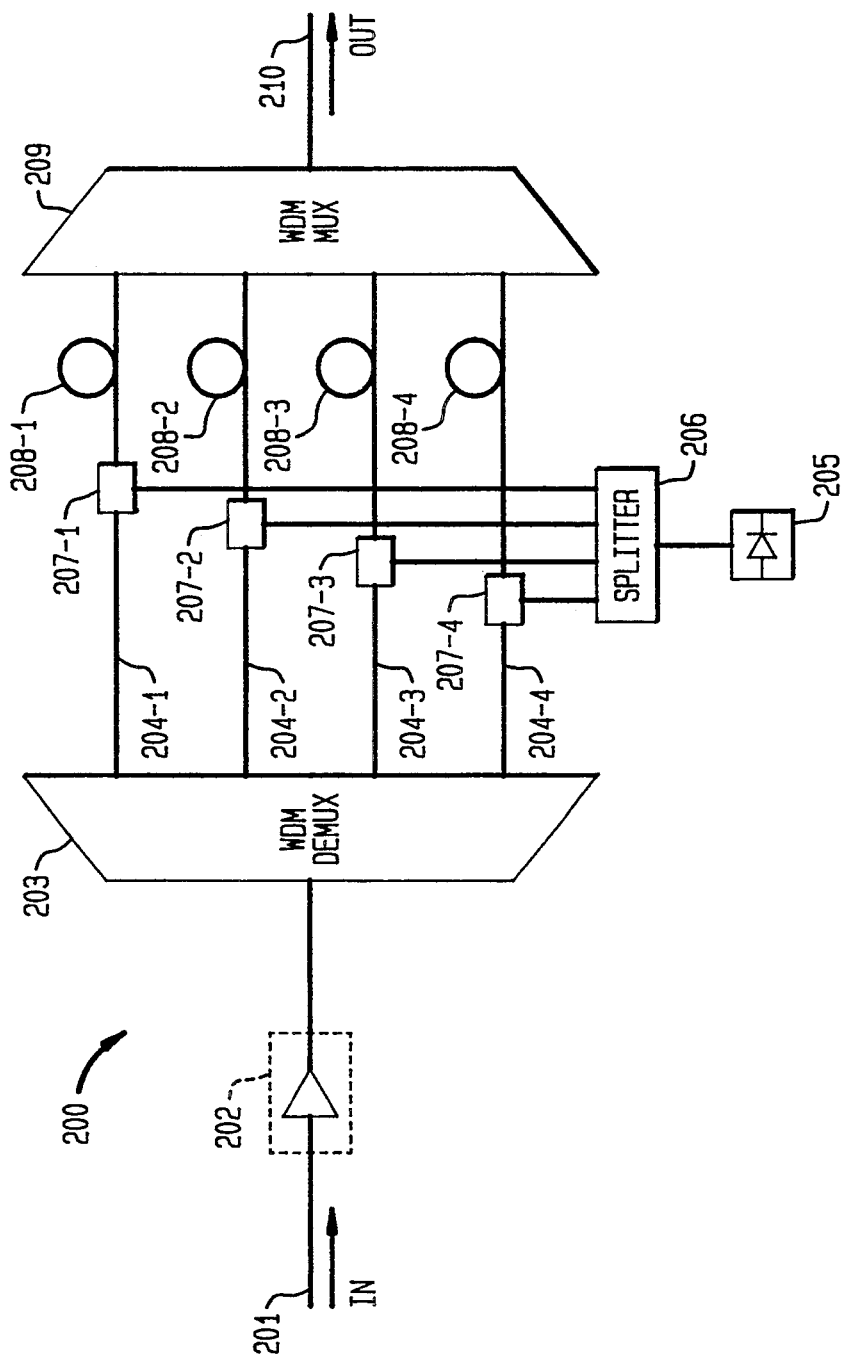
FIG. 2 is a block diagram of a multiwavelength amplifier module used in cascade within the system of FIG. 1, and which shows the optional first gain stage.

With reference to FIG. 2, a multiwavelength amplifier module 200 in accordance with the present invention is shown. The multiwavelength optical signal at input 201 is first passed through an optional first (or input) gain stage 202, which comprises a strongly pumped erbium-doped fiber amplifier. The function and purpose of first gain stage 202 will be described hereinafter. The amplified multiwavelength optical output of gain stage 202, or the direct multiwavelength input optical signal, is inputed to a WDM (wavelength-division-multiplexed) demultiplexer 203 which demultiplexes its WDM optical input into separate optical signals at each of the wavelength channels. In the embodiment of FIG. 2, the input optical signal at 201 comprises four WDM channels. Thus WDM demultiplexer 203 demultiplexes its input signal into four separate optical channels onto fibers 204-1-204-4. The output power of a common pump laser 205 is split by splitter 206 and coupled through dichroic couplers 207-1-207-4 to pump the individual erbium-doped fiber amplifiers 208-1-208-4 operated in gain-saturation and associated with each of the demultiplexed channels. Each erbium-doped fiber amplifier thus amplifies only a single wavelength channel, thereby precluding interchannel cross-saturation problems. The amplified optical outputs of amplifiers 208-1-208-4 are then multiplexed together again by WDM multiplexer 209 to provide an optical signal at output 210 for continued transmission along the optical transmission system.

By operating each of the erbium-doped fiber amplifiers 208-1-208-4 in gain saturation, channel-by-channel power regulation is effected. Furthermore, as noted, the amplifier is immune to transient cross-saturation. In addition, the amplifier is tolerant to loss variations that may occur along the transmission path. Thus, if a disturbance at some point in the transmission system affects all the channels equally, the subsequent stages will tend to automatically equalize-out the effects of the disturbance. Similarly, if a loss only affects some of the channels, then only those channels will be compensated.

The erbium-doped fiber amplifiers 208-1-208-4 are shown as being commonly pumped by a single pump laser 205, which output power is split. This advantageously enables a single laser to function as four separate pump lasers, thereby reducing the cost of the amplifier module. A single pump laser is not, however, a requirement of the present invention.

A multiwavelength amplifier module comprising only a second stage as described hereinabove will provide the desired channel-by-channel power regulation and immunity to transient cross-saturation. Improved performance, however, can be obtained by including the optional first (or input) gain stage 202. This first gain stage comprises a conventional erbium-doped fiber amplifier preferably pumped at strong pumping levels. The first gain stage 202 will then provide strong-gain and high power input to the second stage which then provides per-channel equalization. Although the first stage will in effect cause some "damage" to the optical signal with respect to undesirable power spread, the damage it in fact introduces is corrected by the second stage which maintains the same wavelength-to-wavelength power relationships and prevents the accumulation of power inequalities. The advantage and the purpose for including the first stage is to achieve an overall improved optical signal-to-noise ratio over that which is obtained using only the second stage amplifier, while still maintaining the desired self-regulating properties of the multiwavelength module. Such improved optical signal-to-noise performance implies that the amplifier module can function with a larger loss between modules in the communications system, with the advantages that accrue therefrom, such as increased permissible intermodule spacing.

EXPERIMENTAL RESULTS

To demonstrate the properties of the multiwavelength amplifier module of the present invention described above, measurements were performed on an amplifier module such as shown in FIG. 2. Four twenty-meter lengths of erbium-doped fiber shared a 70-mW 1480-nm pump laser, with each fiber receiving $\sim 13$ mW of pump light, and providing $\sim 14$ dB of small-signal gain at 1550 nm. The fibers were placed between interference-filter-based wavelength multiplexers having nearly flat, 1.5 nm passbands at the signal locations of 1546, 1550, 1554, and 1558 nm. Each multiplexer imposed 1.5 dB of insertion loss on each channel, and 27 dB of isolation between any pair of channels. Each dichroic coupler (207-1-207-4) added $\sim 1$ dB of insertion loss at 1550 nm. Thus, when the assembled amplifier module was operated single-stage (i.e. without the first gain stage 202), it provided each channel with a small-signal gain of $10.0 \pm 0.2$ dB. The optional first gain stage 202 in FIG. 2 consisted of a conventional, bidirectionally pumped, single-stage fiber amplifier employing 40-mW, 1480-nm pump lasers and operated at a relatively strong inversion level of $n_2/n_1 \sim 3$. Its small-signal gain at 1550 nm was 25 dB.

Figure 3:
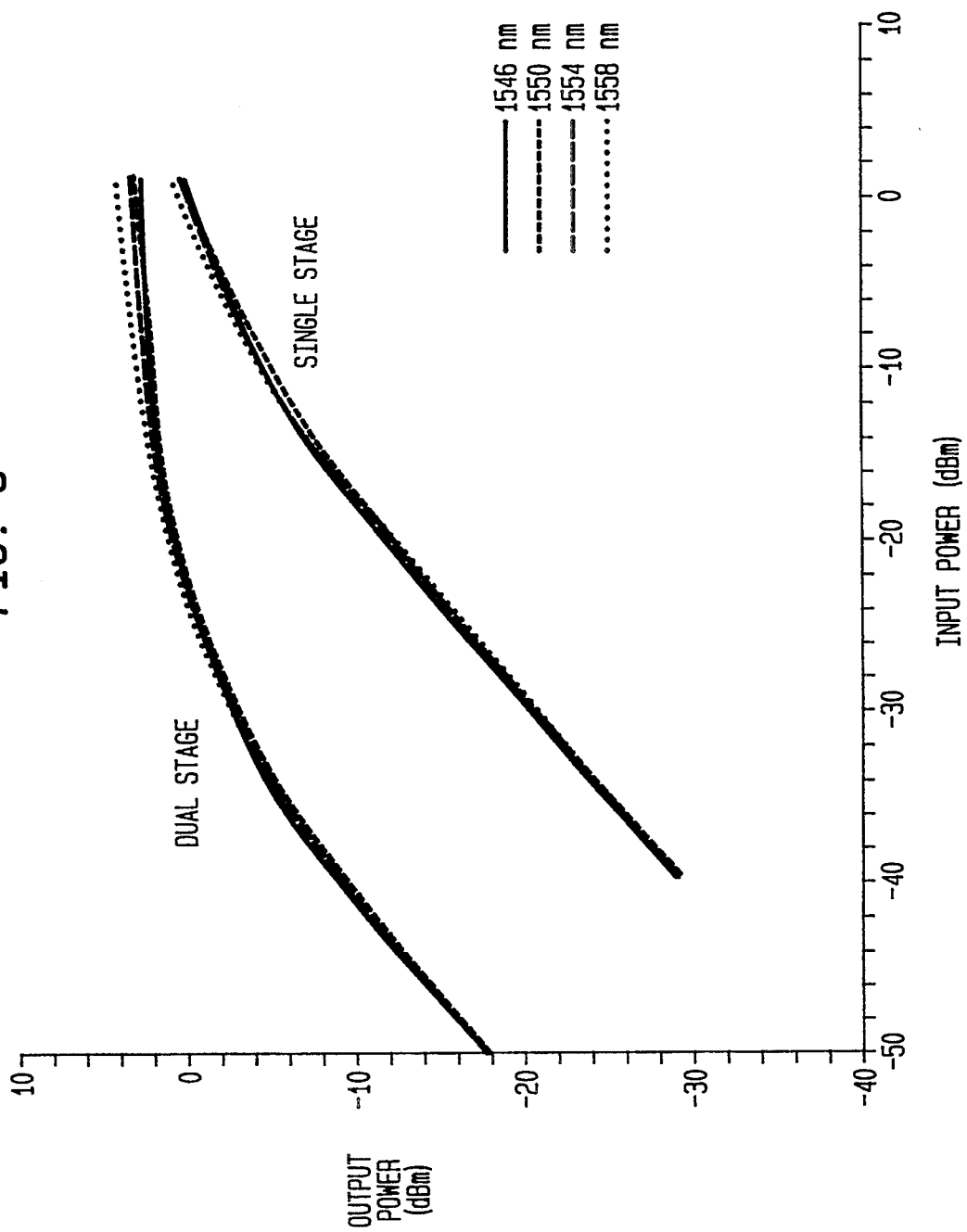
FIG. 3 shows the measured output power versus input power for four channels for an experimental verification of the performance of the multiwavelength amplifier module of FIG. 2 both including and excluding the optional first gain stage.

FIG. 3 shows the measured output power versus input power at each of the four channel locations for the single-stage amplifier module, and for the dual-stage module employing the optional first gain stage 202. Power levels were measured at the positions 201 and 210. The single-stage amplifier showed complete decoupling of saturation dynamics for the various channels, as one would expect given the multiplexer parameters stated above; its per-channel gain and output-power levels thus showed no measurable sensitivity to the number of channels incident on the module. The dual-stage module showed slight coupling, as one would also expect, due to gain-competition in the first stage; the data of FIG. 3 was obtained by varying all input-signal power levels in unison.

At low input-power levels, little interchannel power-spread is seen in FIG. 3. At high input power, the output-power spread approached $\sim 0.8$ dB in the single-stage module, and $\sim 1.5$ dB in the dual-stage module. Power spreads of this magnitude are readily tolerated in communications systems. The issue that needs addressing is "scalability", i.e., does the interchannel power spread accumulate from stage-to-stage?

The chief virtue of this system is that interchannel power-spread does not accumulate from stage-to-stage, so long as the system is operated in gain-saturation. On the contrary, when illuminated with signals at widely divergent per-channel powers, the system will tend to compress the interchannel power-spread to a small, fixed value. This was shown through measurements on a single amplifier module, since measurements were unable to be performed on cascades of them.

Figure 4:
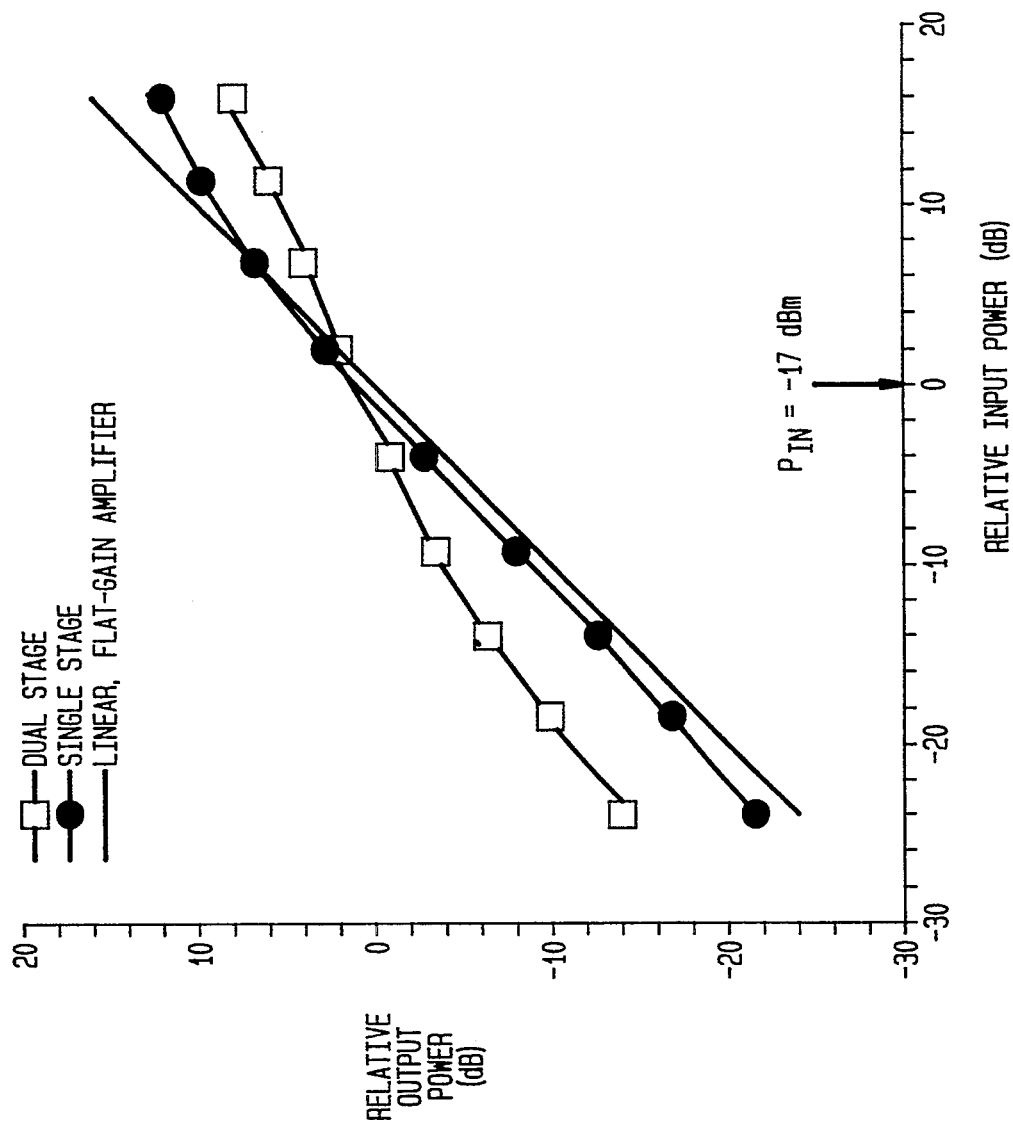
FIG. 4 shows the power-equalizing behavior of the multiwavelength amplifier module of FIG. 2 for the experimental verification.

FIG. 4 displays the amplifier's power-equalizing behavior when the three short-wavelength channels entered at equal input-power levels of $P_{1546}^{in} = P_{1550}^{in} = P_{1554}^{in} = -17$ dBm, while $P_{1558}^{in}$ was allowed to vary. In this case, the output powers $P_{1546}^{out}$, $P_{1550}^{out}$, and $P_{1554}^{out}$ were measured to be equal within 1 dB, while $P_{1558}^{out}$ was varied. The figure plots relative output power, defined as $P_{1558}^{out} - P_{1550}^{out}$, versus relative input power, defined as $P_{1558}^{in} - P_{1550}^{in}$. It is seen that the single-stage module, which is nearly linear at $P^{in} = -17$ dBm, provided little equalization at this power level. The dual-stage module, on the other hand, behaved much like a parallel set of per-channel limiting amplifiers, and provided strong equalization even at low input-power levels. This is the principal advantage of the dual-stage configuration: strong equalization occurs at relatively low input power and high gain; thus, relatively large interamplifier losses can be used, so long as the accumulation of spontaneous-emission noise permits. In addition, the use of a strongly inverted first gain stage, obtained e.g. by pumping at 980 nm, will in certain cases improve the gain module's effective spontaneous-emission factor.

Figure 5:
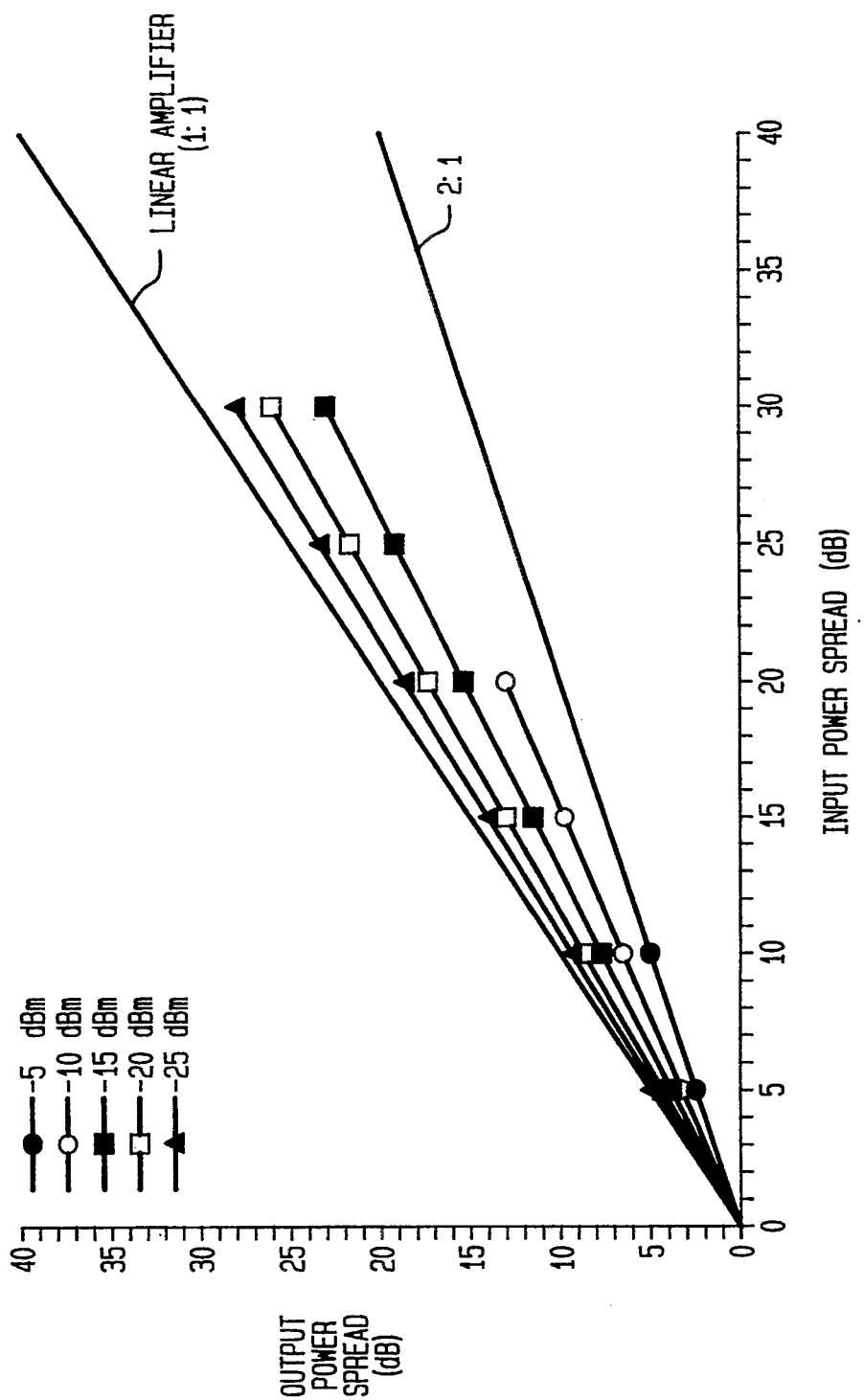
FIG. 5 shows the input-output power-spread relations measured between two channels.

Since the per-channel gains provided by the single-stage multiwavelength amplifier module are completely decoupled from one another, this module's multiwavelength performance is easily characterized. Given a pair of input channels with per-channel powers $P_1^{in}$ and $P_2^{in}$, in dB, the output-power spread $P_1^{out} - P_2^{out}$ is fully determined by the input-power spread $P_1^{in} - P_2^{in}$ and the quantity $\hat{P} = \frac{1}{2}(P_1^{in} + P_2^{in})$, with no dependence on the other per-channel power-levels propagating through the system. $\hat{P}$ provides a measure of the amplifier's saturation level. FIG. 5 shows the input-output power-spread relations measured using the channels at 1546 nm and 1550 nm; however, because the module's gain depends only weakly on wavelength (cf. FIG. 3), the curves of FIG. 5 are accurate $\pm 0.5$ dB for any pair of channels. FIG. 5 shows that the single-stage module becomes an effective power-equalizer when operated at large $\hat{P}$, where it is well into gain-saturation. For example, at $\hat{P} = -5$ dBm, the power-spread at the output, in dB, is half that at the input.

The performance of a cascade of single-stage multiwavelength amplifier modules is easily predicted to reasonable accuracy by using the fact that the per-channel gains are decoupled. One need only choose a value of the per-channel power $P_{in}$ incident on each amplifier; this design choice will in turn be constrained by the accumulation of degradations due to spontaneous-emission noise and fiber nonlinearity. The target loss L between amplifier modules is then given implicitly by the expression $$LG_0 \exp[(1-L^{-1})(P_{in}/P_{sat})] = 1, \qquad (2)$$

obtained from C. R. Giles and E. Desurvire in "Propagation of Signal and Noise in Concatenated Erbium-Doped Fiber Optical Amplifiers," *IEEE Journal of Lightwave Technology*, Vol. 9, pp. 147–154, 1991, by setting the saturated gains of the modules equal to the losses between them. Here $G_0$ is the amplifier's small-signal gain and $P_{sat}$ is its saturation power, with all quantities in linear units and $L < 1$. Equation (2) has a nonzero solution for $P_{in}$, provided that $G_0 > L^{-1}$; thus, the amplifiers must be operated in gain-saturation. If L varies along the chain, $P_{in}$ will also show variations, though these will be partly compensated by the compressed amplifiers' self-adjusting gains.

The single-stage curve of FIG. 3 in fact represents a measurement of the relations implicit in equation (2) if one sets $L = P_{in}/P_{out}$. Thus, choosing a reasonable input-power level of $-10$ dBm, FIG. 3 shows that an interamplifier loss of 8 dB ($= -2$ dBm $+10$ dBm) should be selected. Given a set of per-channel powers incident on a cascade of such multiwavelength amplifier modules, their evolution along it can then be computed through iterative use of FIG. 3. An example is plotted in FIG. 6, where the per-channel input power $[P_{1546}^{in}, P_{1550}^{in}, P_{1554}^{in}, P_{1558}^{in}] = [-20, -15, -5, 0]$ dBm, with 8 dB of loss between amplifiers. Although the amplifiers are gain-compressed by only $\sim 2$ dB, it is seen from FIG. 6 that the system rapidly power-equalizes. The interchannel power spread, initially 20-dB, drops to $\sim 10$ dB at the input to the third module, thereafter approaching an equilibrium value of $\sim 1$ dB. The spread then remains fixed from stage to stage.

Figure 6:
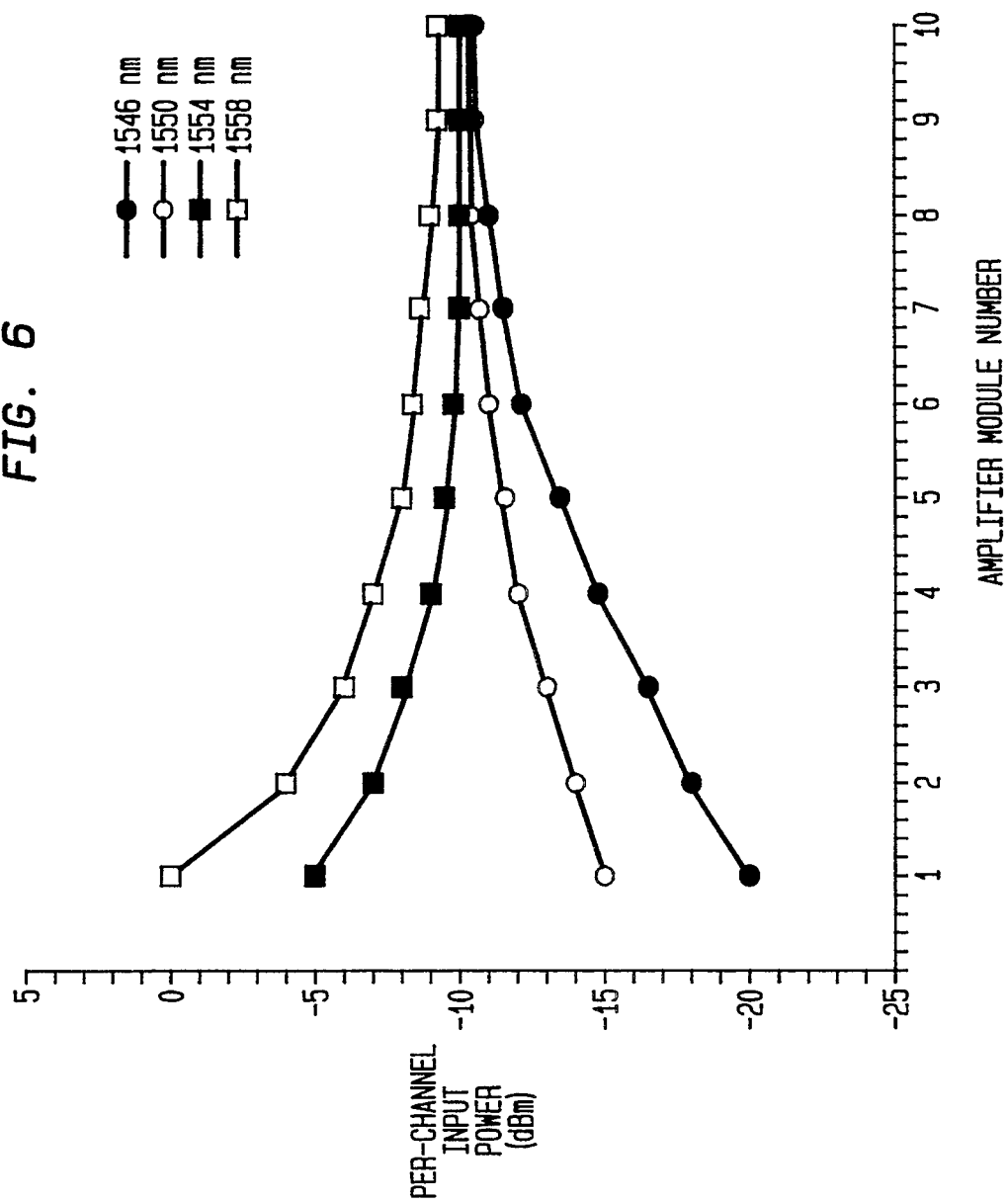
FIG. 6 shows calculated per-channel input power as a function of multiwavelength amplifier module number in a cascade of multiwavelength amplifier modules.

The calculations of FIG. 6 are believed to be extremely accurate for the small chain lengths plotted in the figure. Moreover, for amplifier gains smaller than $\sim 20$ dB, such calculations will be accurate for much longer chains. However, in sufficiently long chains, the amplified spontaneous emission (ASE) integrated over a multiplexer passband will become comparable to the signal power residing there. At this point, the per-channel powers plotted in FIG. 6 continue to be correct, but they must be interpreted as the sum of signal power plus ASE power. This quantity will again be fixed from stage-to-stage, but the signal component will gradually decline as the ASE rises. Eventually, the performance will reach beat-noise limits. Thus, as with conventional fiber amplifiers, the multiwavelength amplifier module of the present invention will impose scaling limits on amplified wavelength-multiplexed systems. However, unlike conventional amplifiers, the scaling limits imposed by the multiwavelength amplifier module of the present invention are expected to be essentially the same as those constraining the single-wavelength ultra-long-haul amplifier chains that are currently being installed under the world's oceans.

In summary, it has been shown that well-configured cascades employing multiwavelength amplifier modules of the present invention, as shown in FIG. 2, exhibit no accumulating interchannel power-spread, as do chains of conventional fiber amplifiers. Instead, they serve to equalize power-differences, while automatically adjusting to component-loss variations and providing immunity to transient cross-saturation. In WDM systems employing this approach, system scalability is thus expected to be constrained not by the amplifier gain spectrum, but by essentially the same limits that arise in single-wavelength amplifier cascades.

The above-described embodiment is illustrative of the principles of the present invention. Other embodiments could be devised by those skilled in the art without departing from the spirit and scope of the present invention.

What is claimed is:

1. A multiwavelength lightwave communications system comprising:
   an optical transmission medium;
   an optical transmitter for transmitting wave-division-multiplexed (WDM) plural signal channels onto said optical transmission medium;
   an optical receiver for receiving WDM plural signal channels from said optical transmission medium; and
   a cascade of multiwavelength amplifier modules, said cascade connected along said optical transmission medium between said optical transmitter and said optical receiver, each multiwavelength amplifier module comprising optical demultiplexing means for demultiplexing a WDM signal from the transmission medium into a plurality of separate single-wavelength channels on separate outputs of the demultiplexing means, a plurality of fiber amplifiers operated in gain-saturation each one connected to one of the outputs of said demultiplexing means, said plurality of fiber amplifiers separately amplifying each of the single-wavelength channels at each of the outputs of the demultiplexing means, and optical multiplexing means for multiplexing the plurality of amplified single-wavelength channels into one multiwavelength amplifier module WDM output signal.

2. A multiwavelength lightwave communications system in accordance with claim 1 wherein each multiwavelength amplifier module further comprises an input amplifier stage connected between the transmission medium and the demultiplexing means, and wherein said input amplifier stage is a high-gain fiber amplifier.

3. A multiwavelength lightwave communications system in accordance with claim 2 wherein the fiber amplifiers in said cascade are erbium-doped fiber amplifiers.

4. A multiwavelength lightwave communications system in accordance with claim 1 wherein each multiwavelength amplifier module further comprises a single pump laser and a power splitter for providing pump energy to each of the fiber amplifiers in the module.

5. In a multiwavelength lightwave communications system in which wave-division-multiplexed (WDM) plural channels are transmitted on an optical fiber, amplifying means for amplifying said plural channels, said amplifying means comprising a plurality of multiwavelength amplifier modules spaced along said optical fiber, each of said multiwavelength amplifier modules comprising optical demultiplexing means for demultiplexing a WDM signal from the optical fiber into a plurality of separate single-wavelength channels on separate outputs of the demultiplexing means, a plurality of fiber amplifiers operated in gain-saturation each one connected to one of the outputs of said demultiplexing means, said plurality of fiber amplifiers separately amplifying each of the single-wavelength channels at each of the outputs of the demultiplexing means, and optical multiplexing means for multiplexing the plurality of amplified single-wavelength channels into one multiwavelength amplifier module WDM output signal.

6. Amplifying means in accordance with claim 5 wherein each multiwavelength amplifier module further comprises an input amplifier stage connected between the optical fiber and the demultiplexing means, and wherein said input amplifier stage is a high-gain fiber amplifier.

7. Amplifying means in accordance with claim 6 wherein said fiber amplifiers are erbium-doped fiber amplifiers.

8. Amplifying means in accordance with claim 5 wherein each multiwavelength amplifier module further comprises a single pump laser and a power splitter for providing pump energy to each of the fiber amplifiers in the module.

9. A multiwavelength amplifier module for amplifying a plurality of channels at a plurality of wavelengths transmitted in a single wave-division-multiplexed (WDM) input optical signal in a multiwavelength lightwave communications system, said amplifier module comprising optical demultiplexing means for demultiplexing the WDM optical signal into a plurality of separate single-wavelength channels on separate outputs of the demultiplexing means, a plurality of fiber amplifiers operated in gain-saturation each one connected to one of the outputs of said demultiplexing means, said plurality of fiber amplifiers separately amplifying each of the single-wavelength channels at each of the outputs of the demultiplexing means, and optical multiplexing means for multiplexing the plurality of amplified single-wavelength channels into one WDM output signal.

10. A multiwavelength amplifier in accordance with claim 9 further comprising an input amplifier stage, said WDM optical input signal being inputed to an input of said input amplifier stage and an output of said input amplifier stage being connected to an input of said demultiplexing means, wherein said input amplifier stage is a high-gain fiber amplifier.

11. A multiwavelength amplifier in accordance with claim 10 wherein said fiber amplifiers are erbium-doped fiber amplifiers.

12. A multiwavelength amplifier in accordance with claim 9 further comprising a single pump laser and a power splitter for providing pump energy to each of the fiber amplifiers in the module.

* * * * *